Sept. 22, 1970     V. J. WEMLINGER     3,529,765
HEAT-SEALABLE GUSSETED BAG
Filed Oct. 18, 1968
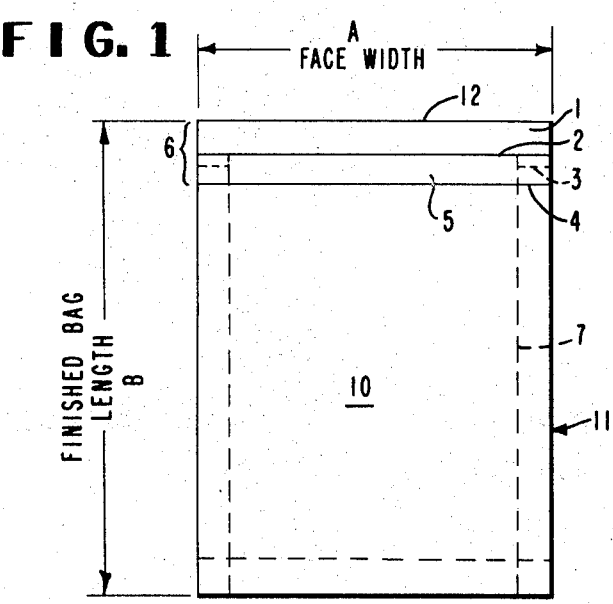
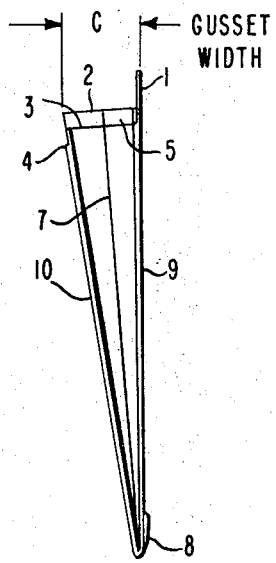
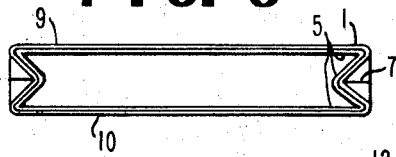
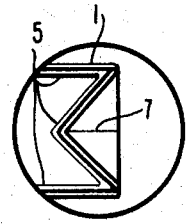
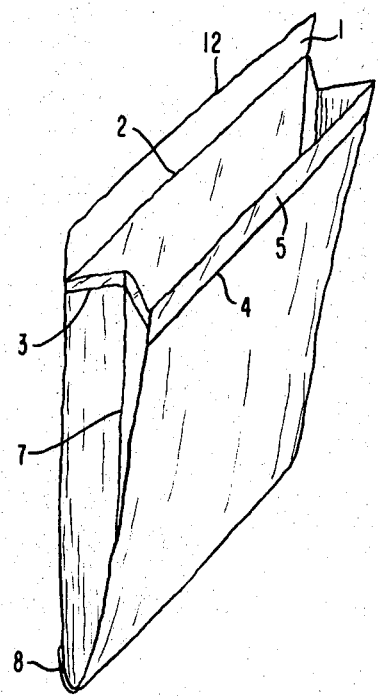
INVENTOR
VINCENT J. WEMLINGER
BY Michael J. Bradley
ATTORNEY

United States Patent Office 3,529,765
Patented Sept. 22, 1970

3,529,765
HEAT-SEALABLE GUSSETED BAG
Vincent J. Wemlinger, Wilmington, Del., assignor to E. I. du Pont de Nemours and Company, Wilmington, Del., a corporation of Delaware
Filed Oct. 18, 1968, Ser. No. 768,712
Int. Cl. B65d *33/22*
U.S. Cl. 229—62         5 Claims

ABSTRACT OF THE DISCLOSURE

An improved gusseted, step-down, heat-sealable, laminated bag which has an improved heat-seal can be produced by altering the construction of a normal heat-sealable step-down bag by continuing the step-down to one ply through the gusseted portion of the bag to eliminate the excessive thickness of the gusseted area and improve the heat-seal at the inner end of the gusset.

---

In the packaging of hygroscopic materials the largest problem to be overcome is that during shipment and storage the material tends to pick up excessive amounts of water. The best method to prevent the material from picking up moisture is to ship it in sealed cans, but this is also the most expensive packaging method. A less expensive means of shipping such materials is paper bags. The major drawback of paper bags is that they are extremely permeable to water. Thus, it is necessary to coat or line the bags with some form of water-impermeable material such as a plastic coating or bag. Adding a separate plastic coating to the bag or inserting a plastic liner in a bag requires additional packaging steps with the resultant increased cost in packaging. It is desirable then that the water impermeable protective layer be integrally constructed with the bag itself.

Heat-sealable, multi-walled bags having a plastic foil and paper laminated inner ply have been produced in a tubular bag which has no gussets. The main disadvantage of this type of bag is that when filled the corners of the bag protrude out beyond the sides of the bag and are subject to abuse and tearing, which may result in damage to the heat-seal. Gusseted multi-wall heat-sealable bags have two distinct problems: first, they are difficult to seal due to the number of thicknesses (plies) of paper at each end where the gusset is formed (i.e., on a four-ply bag the gusseted area would be 16 plies thick while the center portion of the top of the bag would be only 8 plies thick). This results in great difficulty in heat-sealing through 16 plies at one portion of the bag and only 8 plies at another portion of the bag; second, the step-down from the gusseted part of the bag to the center part of the bag (from 16 plies to 8 plies) results in a small pinhole area in which it is very difficult to effect a complete seal. This allows moisture to enter the bag and on storage or shipment, the moisture content of the product becomes too high.

Applicant has discovered that by cutting out the outer plies from the gusseted area where the heat seal is to be made (the three outer plies in a four-ply bag) and removal of the three outer plies across the face of the bag at the end to be sealed, would result in a maximum thickness in the gusseted area, on a four-ply bag, of seven plies in the gusseted area and 5 plies in the non-gusseted area across the face at the end of the bag. This minor difference in the number of plies allows a better and more complete heat-seal to be effected at lower temperatures with no reduction of bag strength.

FIG. 1 shows a front view of the open bag of FIG. 4.
FIG. 2 shows a side view of the open gusseted bag of FIG. 4.
FIG. 3 shows a top view and FIG. 3A shows one end blown up of the gusseted bag of FIG. 4.
FIG. 4 shows a perspective view of the open gusseted bag.

Referring to the drawings, the heat-sealable gusseted bag 11 of this invention can be made on conventional gusseted bag-making machinery. In the process of making gusseted bags, it is common in the art to make a step-down cut arrangement at the bag ends to provide a closure device. As shown in FIG. 1, the step-down cut arrangement is made by cutting the bag at line 4 to remove several plies of material, making a second cut at line 2 to remove several more plies of material, and cutting the bag to length at line 12. This results in a flap 6 which is thinner between lines 2 and 12 than between lines 2 and 4 and which is thinner than face 10 of the bag. The bag is then folded along line 4 which forms flap 6 which can be stapled, sewn or sealed with adhesives.

The heat-sealable bag of this invention is formed much like the conventional gusseted bag in that the cut along line 4 removes all material but the inner ply 5 from face 10 in the area between lines 2 and 4 and the cut along line 2 leaves only the outer plies of face 9. In addition, in the gusseted area, there is another cut made between lines 2 and 4 along line 3 to remove the outer plies 1 and leave the inner ply 5 in the gusseted area on both sides of the bag.

The heat seal is then formed in the area between lines 2 and 3 (extended). The bag is then folded along line 4 and sealed, which results in an end flap 6 similar to flap 8. Due to the small number of plies difference between the gusseted areas and the center of the seal area where the seal is made, a continuous uninterrupted seal can be effected. The seal area is also made non-load bearing by making the fold of the bag flap along line 4 which puts the seal area back in the flap rather than at the end of the bag. This novel step-down cut arrangement can be used to form an airtight seal at both ends of the bag.

The face width A and finished bag length B can be of any desired width or length. The gusset width C can be of any desired width. The gusset width C will determine the depth of gusset line 7.

Lines 3 and 4 can be located at any desired distance from line 2 so as to remove sufficient material to allow a proper sealing of the heat-sealable material. The minimum distance that lines 3 and 4 can be from line 2 is approximately ⅛″ while the maximum distance is determined by economics and strength requirements of the end flap. It is not necessary that lines 3 and 4 be at different heights. Lines 3 and 4 can be a continuous line.

As described above, the bag must be of multi-wall construction to be able to effect the novel step-down feature in the gusseted area of the bag of this invention. The inner ply must be heat-sealable and from 1 to 10 mils in thickness. It can be composed of any heat-sealable thermoplastic resin or any laminate of heat-sealable material plus other barrier material. The preferred laminate structure of the inner ply is a kraft paper of approximately 40 pound weight on the outside, at least ½ mil of polyethylene, preferably .5 to 3 mils of polyethylene, at least 1/10 mil aluminum foil, preferably .35 to ½ mil aluminum foil, and at least ½ mil of a copolymer comprising 89% by weight of ethylene, 11% by weight of methacrylic acid which is about 60% neutralized with zinc or sodium ions, 500 p.p.m. of "Santowhite" powder and has a melt index of 1, preferably .5 to 3 mils of said copolymer.

The outer plies can be of any number depending on the strength requirements of the bag. Any type of normal bagging paper or material can be used to form the outer plies. Among the types of material that can be used to form the various plies of this bag are kraft paper, extensible crepe paper, burlap, and asphalt laminates.

The bags of this invention can be made on continuous conventional bag production machinery and can be supplied by a bag manufacturer with one end closed and sealed or can be supplied with both ends open. An adhesive is normally used to close the end flaps after heat sealing but any other conventional closing method that doesn't rupture the bag's seal can be used.

EXAMPLES 1–9

50 lb. bags incorporating the novel step-down feature of this invention and used in these examples are constructed of 4 plies as follows: (1) an inner laminated ply consisting of one 3 mil thermoplastic resin layer (said resin being a copolymer comprising 89% by weight of ethylene, 11% by weight of methacrylic acid which is about 60% neutralized with zinc or sodium ions, 500 p.p.m. of "Santowhite" powder and has a melt index of 1), one .5 mil aluminum foil layer, one 2 mil polyethylene layer and one 40 lb. kraft paper layer, respectively from inside to outside; (2) one layer of 50 lb. kraft paper; and (3) two layers of 60 lb. kraft paper as the outer two layers.

The bags were filled with a copolymer comprising 89% by weight of ethylene, 11% by weight of methacrylic acid which is about 60% neutralized with zinc or sodium ions, 500 p.p.m. of "Santowhite" powder and has a melt index of 1.

The moisture content of the resin going into the bags is measured and controlled as the resin is placed in the bags and the bags are heat sealed and glued shut with adhesive.

The bags were then shipped and stored and tested for moisture content several months later. Data is shown in Table I. Bag 8 was damaged on one corner in shipment or storage.

EXAMPLE 10

A corrugated fiber board box is filled with 200 lbs. of the type of thermoplastic resin used to fill the bags of Examples 1–9 and sealed with tape. The box is then shipped and tested as in Examples 1–9. Data is shown in Table I.

I claim:
1. A multiwall gusseted bag comprised of two multi-ply opposing faces integrally connected by multi-ply gussets and having a heat-sealed closure at one end and at least one end a stepped-down closure comprising a moisture impervious inner heat-sealable ply having a uniformly cut end and at least one step cut outer ply such that at said end having the stepped-down closure, said outer ply covers and extends above said heat-sealable ply on one face of said bag and extends along said heat-sealable ply on said other face and said gusseted areas to within a minimum distance of about ⅛ inch from said uniformly cut end of said heat-sealable ply to form said stepped-down closure device.

2. The bag of claim 1 in which the heat-sealable inner ply is from about 1 to about 10 mils in thickness.

3. The bag of claim 2 in which the heat-sealable inner ply is formed of a thermoplastic resin material.

4. The bag of claim 2 in which the heat-sealable inner ply is a laminate structure.

5. In a heat-sealable multiwall gusseted bag having multi-ply gussets and two multi-ply stepped-down faces at at least one end to form a heat-sealable closure device, the improvement which comprises continuing the step-down cut which exposes at least about ⅛ inch of the inner heat-sealable ply and extends across one face of said bag through the gusseted area to expose at least about ⅛ inch of the inner heat-sealable ply, to reduce thickness in the gusseted area and facilitate heat sealing of the bag.

TABLE I

| Ex. No. | Shipped to— | Shipped from— | Date | Average original moisture content (p.p.m.) in container | Date tested | Average final moisture content (p.p.m.) in container |
|---|---|---|---|---|---|---|
| 1 | Secaucus, N.J | Orange, Tex | 12/25/67 | 175 | 2/23/68 | 326 |
| 2 | do | do | 12/25/67 | 175 | 2/23/68 | 357 |
| 3 | do | do | 12/25/67 | 175 | 2/23/68 | 281 |
| 4 | Chicago, Ill | do | 12/31/67 | 175 | 3/9/68 | 238 |
| 5 | do | do | 12/25/67 | 175 | 3/9/68 | 485 |
| 6 | do | do | 12/24/67 | 175 | 3/9/68 | 386 |
| 7 | Secaucus, N.J | do | 12/24/67 | 175 | 5/14/68 | 318 |
| 8 | do | do | 12/24/67 | 175 | 5/14/68 | 610 |
| 9 | do | do | 12/24/67 | 175 | 5/14/68 | 336 |
| 10 | do | do | 12/24/67 | 175 | 5/14/68 | 2,930 |

References Cited

UNITED STATES PATENTS 2,975,955  3/1961  McCurry _____ 229—55

FOREIGN PATENTS 1,062,748  3/1967  Great Britain.

DAVID M. BOCKENEK, Primary Examiner

U.S. Cl. X.R.

229—55, 80

PO-1050
(5/69)

UNITED STATES PATENT OFFICE
CERTIFICATE OF CORRECTION

Patent No. 3,529,765      Dated September 22, 1970

Inventor(s) Vincent J. Wemlinger

It is certified that error appears in the above-identified patent and that said Letters Patent are hereby corrected as shown below:

Column 4, Claim 1, lines 3-4, the word "at" is missing (at at least).

SIGNED AND SEALED
NOV 24 1970

(SEAL)
Attest:

Edward M. Fletcher, Jr.
Attesting Officer

WILLIAM E. SCHUYLER, JR.
Commissioner of Patents